US009781298B2

(12) United States Patent
Cabiles et al.

(10) Patent No.: US 9,781,298 B2
(45) Date of Patent: Oct. 3, 2017

(54) IMAGE PROCESSING APPARATUS COMMUNICABLE WITH MOBILE INFORMATION TERMINAL

(71) Applicant: KYOCERA Document Solutions Inc., Osaka-shi, Osaka (JP)

(72) Inventors: Dinnel Cabiles, Osaka (JP); Jan Richie Yu, Osaka (JP); Genessis Pastrana, Osaka (JP); Michelle Tumulak, Osaka (JP); Maria Johanna Ybanez, Osaka (JP); Marie Stephanie Alesna, Osaka (JP); Roy Vincent Maranon, Osaka (JP); Eliot Emerson Uy, Osaka (JP); Franz Joseph Rara, Osaka (JP); Maurice James Sepe, Osaka (JP); Kenneth Arrieta, Osaka (JP); Jay Luzares, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/169,577

(22) Filed: May 31, 2016

(65) Prior Publication Data
US 2016/0366300 A1 Dec. 15, 2016

(30) Foreign Application Priority Data

Jun. 12, 2015 (JP) ................................ 2015-119069

(51) Int. Cl.
*G06F 3/12* (2006.01)
*H04N 1/327* (2006.01)
(Continued)

(52) U.S. Cl.
CPC ..... *H04N 1/32793* (2013.01); *H04N 1/00307* (2013.01); *H04N 1/32101* (2013.01);
(Continued)

(58) Field of Classification Search
CPC .... G06F 3/1297; G06F 3/1204; G06F 3/1236; G06F 3/1292; H04N 1/00307;
(Continued)

(56) References Cited

U.S. PATENT DOCUMENTS

2013/0229690 A1* 9/2013 Sumita ............... H04N 1/00127
358/1.15
2013/0258381 A1 10/2013 Sato
(Continued)

FOREIGN PATENT DOCUMENTS

JP 2013214806 A 10/2013

*Primary Examiner* — Gabriel Garcia
(74) *Attorney, Agent, or Firm* — Alleman Hall Creasman & Tuttle LLP

(57) ABSTRACT

An image processing apparatus includes a job processing portion, a first communication portion, a second communication portion, a job control portion. In the image processing apparatus, the first communication portion performs first wireless communication being proximity-type wireless communication. The second communication portion performs second wireless communication whose communicable distance is longer than that of the first wireless communication and whose communication speed is faster than that of the first wireless communication. After the first communication portion automatically establishes communication connection between the first communication portion and a transmission source of the signal through the first wireless communication, the first communication portion hands over the communication connection to second wireless communication. The image processing apparatus transmits information of a settable condition to a mobile information terminal through the second communication portion, and causes the job processing portion to execute a job in according to a job execution request.

4 Claims, 7 Drawing Sheets

(51) Int. Cl.
*H04N 1/00* (2006.01)
*H04N 1/32* (2006.01)
*G06K 15/00* (2006.01)

(52) U.S. Cl.
CPC . *H04N 1/32765* (2013.01); *H04N 2201/0094* (2013.01); *H04N 2201/3222* (2013.01)

(58) Field of Classification Search
CPC .......... H04N 1/32101; H04N 1/32106; H04N 1/001; H04N 1/00106; H04N 1/00411; H04N 1/00413; H04N 1/32765; H04N 1/32783; H04N 2201/006; H04N 2201/0041; H04N 2201/0094; H04N 2201/3278; H04N 2201/3222
USPC .................................................. 358/1.1–1.18
See application file for complete search history.

(56) References Cited

U.S. PATENT DOCUMENTS

| | | | | |
|---|---|---|---|---|
| 2014/0118769 A1* | 5/2014 | Adachi | ................ | G06F 3/1211 358/1.13 |
| 2014/0355048 A1* | 12/2014 | Kang | .................... | G06F 3/1292 358/1.15 |
| 2015/0181050 A1* | 6/2015 | Nishii | ................ | H04N 1/00307 358/1.15 |

* cited by examiner

IMAGE PROCESSING APPARATUS COMMUNICABLE WITH MOBILE INFORMATION TERMINAL

INCORPORATION BY REFERENCE

This application is based upon and claims the benefit of priority from the corresponding Japanese Patent Application No. 2015-119069 filed on Jun. 12, 2015, the entire contents of which are incorporated herein by reference.

BACKGROUND

The present disclosure relates to image processing apparatuses, mobile information terminals, and image processing systems.

In general, an image processing apparatus such as a scanner, a printer, or a multifunction peripheral includes a touch panel unit. A mobile information terminal which is a mobile-type information processing terminal, such as a so-called smartphone, also includes the touch panel unit. Usually, use of the touch panel unit simplifies operation of the apparatus.

Meanwhile, it is known that the image processing apparatus receives an instruction regarding a job from the mobile information terminal through wireless communication.

For example, it is known that the image processing apparatus transmits, to the mobile information terminal, information of the type of image processing previously received, and the mobile information terminal transmits, to the image processing apparatus, an instruction to execute image processing that corresponds to the received type of image processing. In this case, the image processing apparatus receives the type of image processing in response to operation performed on the touch panel unit.

SUMMARY

An image processing apparatus according to one aspect of the present disclosure is an apparatus communicable with a mobile information terminal, and includes a job processing portion, a body-side first communication portion, a body-side second communication portion, a settable condition transmitting portion, and a job control portion. The job processing portion executes a job regarding image processing. The body-side first communication portion performs first wireless communication being proximity-type wireless communication. The body-side second communication portion performs second wireless communication whose communicable distance is longer than that of the first wireless communication and whose communication speed is faster than that of the first wireless communication. The settable condition transmitting portion transmits information of a settable condition to the mobile information terminal through the body-side second communication portion. The information of the settable condition represents a condition for a job settable in the image processing apparatus. The job control portion causes the job processing portion to execute the job in accordance with a job execution request. The job execution request is received from the mobile information terminal through the body-side second communication portion. If the body-side first communication portion has received a signal used in the first wireless communication, the body-side first communication portion executes a handover process. The handover process is a process of automatically establishing communication connection between the body-side first communication portion and a transmission source of the signal through the first wireless communication, and then handing over the communication connection to the second wireless communication. If the handover process has succeeded, the settable condition transmitting portion transmits the information of the settable condition to the mobile information terminal. The job execution request includes a designated content of the settable condition.

A mobile information terminal according to another aspect of the present disclosure is communicable with an image processing apparatus, and includes a terminal-side first communication portion, a terminal-side second communication portion, a condition setting portion, a job execution requesting portion, and a terminal-side activation control portion. The terminal-side first communication portion performs first wireless communication being proximity-type wireless communication. The terminal-side second communication portion performs second wireless communication whose communicable distance is longer than that of the first wireless communication and whose communication speed is faster than that of the first wireless communication. The condition setting portion causes a display portion to display a setting menu screen on which to present a settable condition received from the image processing apparatus through the terminal-side second communication portion, and the condition setting portion further sets a designated content of the settable condition in accordance with operation performed on an operation portion. The job execution requesting portion transmits a job execution request including the set designated content of the settable condition, to the image processing apparatus through the terminal-side second communication portion. The terminal-side activation control portion causes the condition setting portion to be activated. If the terminal-side first communication portion has received a signal used in the first wireless communication, the terminal-side first communication portion executes a handover process. The handover process is a process of automatically establishing communication connection between the terminal-side first communication portion and a transmission source of the signal through the first wireless communication, and then handing over the communication connection to the second wireless communication. The terminal-side activation control portion causes the condition setting portion to be automatically activated in response to success of the handover process. The settable condition is a condition for a job settable in the image processing apparatus.

An image processing system according to another aspect of the present disclosure includes the image processing apparatus according to one aspect of the present disclosure and the mobile information terminal according to the another aspect of the present disclosure.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings. It should be noted that the following embodiments are examples embodying the present disclosure, and, by nature, do not limit the technical scope of the present disclosure.

First Embodiment

First, a configuration of an image processing system 2 according to a first embodiment will be described with reference to FIGS. 1 to 3. The image processing system 2 includes an image processing apparatus 10 and a mobile terminal 8. The image processing apparatus 10 and the mobile terminal 8 are wirelessly communicable with each other. The mobile terminal 8 is a mobile-type information processing terminal, that is, a mobile information terminal.

[Image Processing Apparatus 10]

Figure 1:
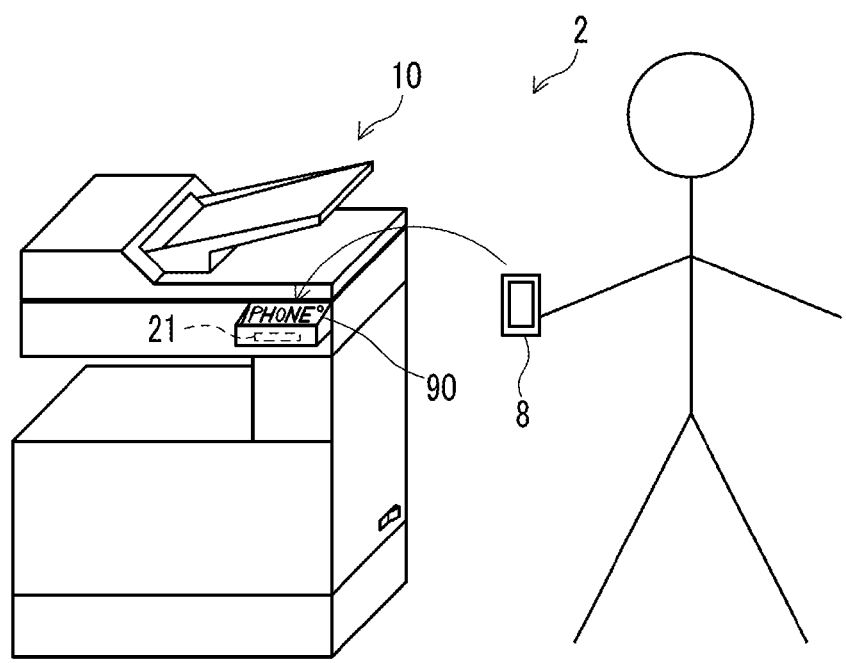
FIG. 1 is a configuration diagram of an image processing system according to a first embodiment.
Figure 2:
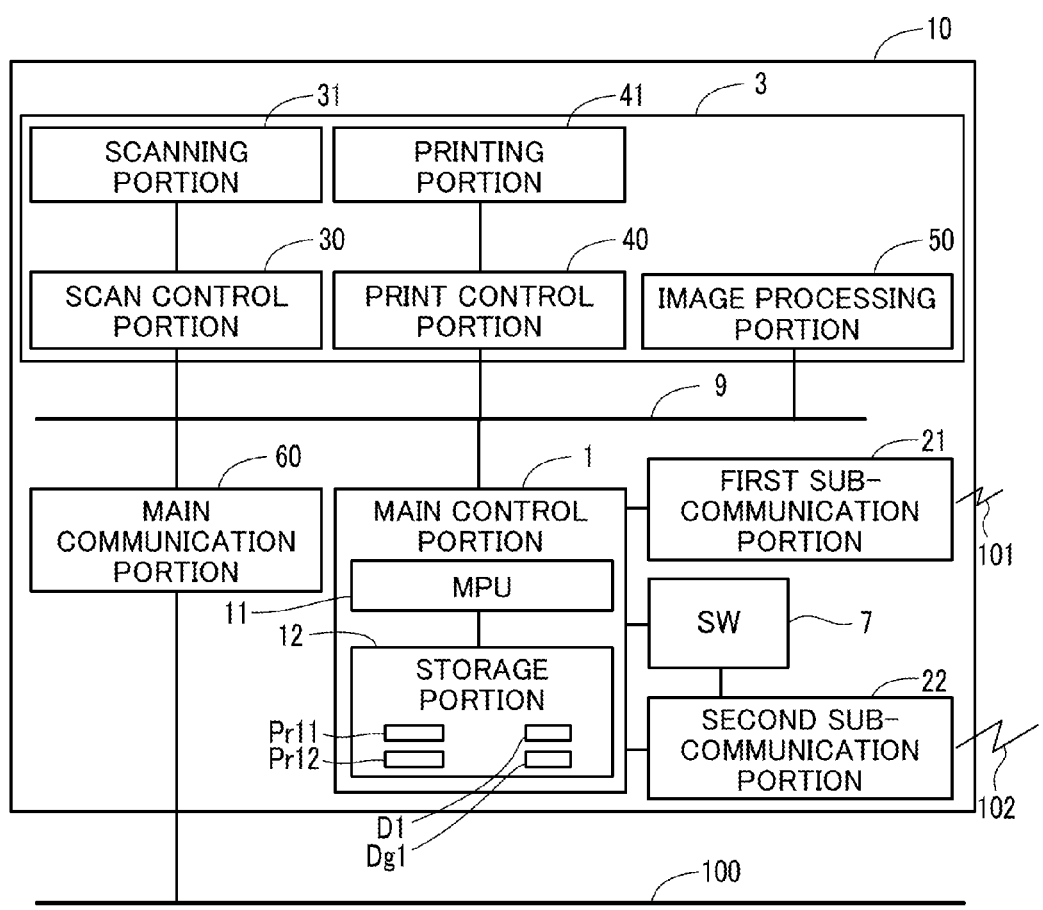
FIG. 2 is a block diagram of an image processing apparatus in the image processing system according to the first embodiment.

The image processing apparatus 10 shown in FIGS. 1 and 2 is a multifunction peripheral which has both of the function of an image reading device configured to read an image from a document sheet and the function of an image forming device configured to form an image on a sheet material.

It is also conceivable that the image processing apparatus 10 is the image forming device, the image reading device, a copying machine, a facsimile machine, or the like.

The image processing apparatus 10 includes a main control portion 1, a scanning portion 31, a scan control portion 30, a printing portion 41, a print control portion 40, a main communication portion 60, an image processing portion 50, a first sub-communication portion 21, a second sub-communication portion 22, an energization switch 7, and the like.

The main control portion 1, the scan control portion 30, the print control portion 40, the main communication portion 60, and the image processing portion 50 are each connected to a bus 9, and can exchange data with one another through the bus 9.

The scanning portion 31 includes: an optical system not shown which scans the document sheet with light; an image sensor not shown which detects, for each pixel, the amount of light reflected from the document sheet and outputs document sheet image data; and the like.

The scan control portion 30 controls the scanning portion 31 and obtains the document sheet image data. Further, the scan control portion 30 transfers, through the bus 9, the document sheet image data to other devices such as the image processing portion 50.

The printing portion 41 forms an image on the sheet material through image forming processing according to well-known electrophotography. The printing portion 41 includes an image carrier not shown and peripheral devices therefor, transfers an image of a developer from the image carrier to the sheet material, and fixes the image on the sheet material.

The print control portion 40 obtains recording image data from the image processing portion 50, and causes the printing portion 41 to execute a process of forming an image based on the recording image data onto the recording sheet.

The main communication portion 60 transmits/receives data to/from an external device over a network 100. The external device is another image processing apparatus 10, a personal computer not shown, or the like.

The main communication portion 60 exchanges data with other devices through the bus 9. For example, the main communication portion 60 receives job data for image formation from the external device, and transfers the job data to the image processing portion 50 through the bus 9.

The main communication portion 60 also has a function of obtaining the document sheet image data from the scan control portion 30 via the image processing portion 50 and of transmitting data including the document sheet image data to the external device.

The image processing portion 50 executes various types of data processing onto image data and the like obtained from other devices through the bus 9. The target of data processing performed by the image processing portion 50 is, for example, the document sheet image data obtained from the scan control portion 30, the job data obtained from the external device through the main communication portion 60, or the like.

For example, the image processing portion 50 performs image processing such as image rotation processing, halftone processing, or size cut processing, onto the document sheet image data obtained from the scan control portion 30. The image processing portion 50 also executes, for example, a process of converting the document sheet image data obtained from the scan control portion 30 and the job data obtained from the main communication portion 60, into recording image data, and of transferring the recording image data to the print control portion 40.

The scanning portion 31, the scan control portion 30, the printing portion 41, the print control portion 40, and the image processing portion 50 execute a job regarding image processing, such as a scanning job, a copying job, or the like, in accordance with a control command from the main control portion 1. In the present embodiment, the scanning portion 31, the scan control portion 30, the printing portion 41, the print control portion 40, and the image processing portion 50 are examples of a job processing portion 3 which executes the job.

The first sub-communication portion 21 and the second sub-communication portion 22 are each a communication interface which performs wireless communication with the mobile terminal 8 as a communication partner. Details of the first sub-communication portion 21 and the second sub-communication portion 22 will be described later.

The energization switch 7 performs switching between turning on and off of power supply to the second sub-communication portion 22 in accordance with a control signal from the main control portion 1. The second sub-communication portion 22 is activated by receiving power supply through the energization switch 7. The second sub-communication portion 22 enters a stop state upon the power supply being stopped by the energization switch 7.

The main control portion 1 performs comprehensive control over other control portions and communication portions. The main control portion 1 causes the job processing portion 3 to execute a job regarding image processing. As shown in FIG. 2, the main control portion 1 includes an MPU (microprocessor unit) 11, a storage portion 12, and the like.

The MPU 11 is a processor which executes various types of calculation and data processing. The storage portion 12 is a non-volatile storage portion in which various types of information referred to by the MPU 11 are stored. The storage portion 12 is also a storage portion from/into which the MPU 11 can read/write various types of information.

In the storage portion 12, programs for causing the MPU 11 to execute various types of processes, information referred to by the MPU 11 executing the programs, and information written by the MPU 11 executing the programs are stored. For example, in the storage portion 12, the programs and settable condition information D1, and the like are stored. The settable condition information D1 will be described later.

[Mobile Terminal 8]

The mobile terminal 8 is a portable information processing apparatus such as a smartphone, a tablet computer, or a wearable computer. The mobile terminal 8 is carried by a user of the image processing apparatus 10.

Figure 3:
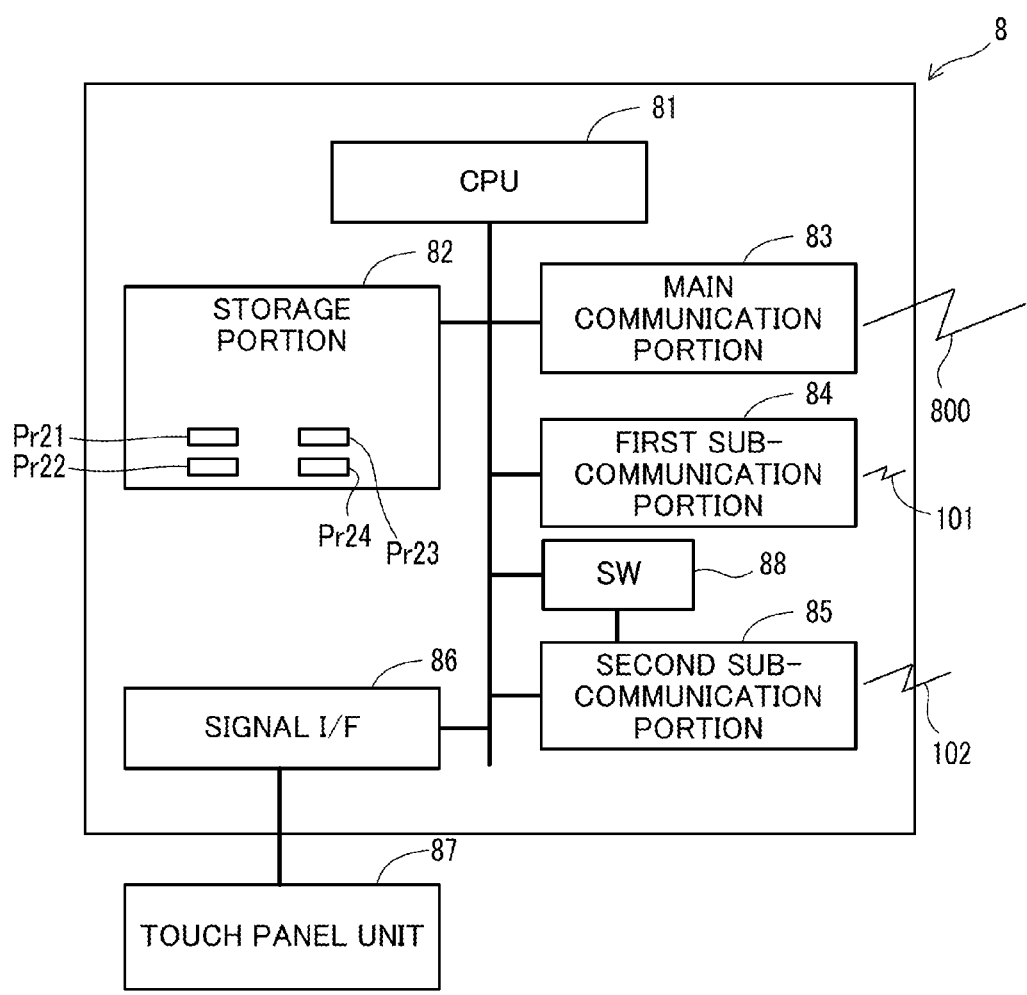
FIG. 3 is a block diagram of a mobile information terminal in the image processing system according to the first embodiment.

As shown in FIG. 3, the mobile terminal 8 includes a CPU 81, a storage portion 82, a main communication portion 83, a first sub-communication portion 84, a second sub-communication portion 85, a signal interface 86, a touch panel unit 87, an energization switch 88, and the like.

The CPU 81 is a processor which executes various types of calculation and data processing. The storage portion 82 is a non-volatile storage portion in which various types of data referred to by the CPU 81 are stored. The storage portion 82 is also a storage portion from/into which the CPU 81 can read/write various types of data.

In the storage portion 82, programs for causing the CPU 81 to execute various types of processes are also stored. The mobile terminal 8 also includes a volatile storage portion not shown, such as a RAM, in which programs executed by the CPU 81 are temporarily stored.

The main communication portion 83 is a wireless communication interface which transmits/receives sound data and other data to/from another mobile terminal 8 over a public communication line 800.

For example, the main communication portion 83 performs wireless communication in accordance with a communication protocol such as the GMS (Global System for Mobile Communications) standard, the CDMA (Code Division Multiple Access) standard, or the W-CDMA (Wideband Code Division Multiple Access) standard. The CPU 81 transmits/receives data to/from another mobile terminal 8 through the main communication portion 83.

The touch panel unit 87 includes a panel display portion such as a liquid crystal display panel, and a touch panel sensor formed on the surface of the panel display portion. That is, the panel of the touch panel unit 87 serves as an operation portion and a display portion for a screen.

The CPU 81 performs data processing based on data or an instruction inputted through the touch panel unit 87. The CPU 81 outputs, to the touch panel unit 87, an operation screen or a screen on which to display a result of data processing. The touch panel unit 87 is an example of the operation portion and the display portion in the mobile terminal 8.

The energization switch 88 performs switching between turning on and off of power supply to the second sub-communication portion 85 in accordance with a control signal from the CPU 81. The second sub-communication portion 85 is activated by receiving power supply through the energization switch 88. The second sub-communication portion 85 stops by the power supply being stopped by the energization switch 88.

Meanwhile, with regard to the image processing apparatus 10, there are increasing demands for power saving, cost reduction, and simplification of operation. For example, it is conceivable that the touch panel unit is omitted in the image processing apparatus 10 and the image processing apparatus 10 is operated through the mobile terminal 8. This greatly contributes to power saving and cost reduction for the image processing apparatus 10.

For example, it is conceivable that in the image processing apparatus 10 and the mobile terminal 8, wireless communication whose communicable distance is about 1 m or greater is used. In this case, a process is required that distinguishes the true user's mobile terminal 8 from other mobile terminals 8 and that establishes wireless communication connection with the user's mobile terminal 8. Accordingly, in the mobile terminal 8, operation until establishment of the wireless communication connection is complicated.

On the other hand, it is also conceivable that, in the image processing apparatus 10 and the mobile terminal 8, wireless communication whose communicable distance is about 10 cm is used. In this case, in the mobile terminal 8, operation until establishment of the wireless communication connection is simple, but usually, the communication speed is not fast. Thus, execution of a job regarding image processing takes time.

According to the present embodiment, even if an operation display portion such as the touch panel unit in the image processing apparatus 10 is omitted, job execution by the image processing apparatus 10 is enabled through simple operation. The details will be described below.

[First Sub-Communication Portion 21 and Second Sub-Communication Portion 22 of Image Processing Apparatus 10]

The first sub-communication portion 21 is a communication interface that performs proximity-type wireless communication. The second sub-communication portion 22 is a communication interface that performs wireless PAN (Wireless Personal Area Network) communication. That is, the second sub-communication portion 22 performs wireless communication whose communicable distance is longer than that of the wireless communication performed by the first sub-communication portion 21. Further, the speed of wireless communication performed by the second sub-communication portion 22 is faster than the speed of wireless communication performed by the first sub-communication portion 21.

In the following description, the wireless communication performed by the first sub-communication portion 21 will be referred to as first wireless communication 101, and the wireless communication performed by the second sub-communication portion 22 will be referred to as second wireless communication 102. It should be noted that the first sub-communication portion 21 and the second sub-communication portion 22 are examples of a body-side first communication portion and a body-side second communication portion, respectively.

For example, it is conceivable that the first wireless communication 101 is wireless communication that conforms to the ISO/IEC 18092 standard, that is, so-called NFC (Near Field Communication). It is also conceivable that the second wireless communication 102 is wireless communication that conforms to the IEEE 802.15.1 standard, that is, so-called Bluetooth (registered trademark) communication.

NFC uses radio waves of 13.56 MHz band frequencies. In NFC, the communicable distance is about 100 millimeters or shorter, and the communication speed is 424 kbps at maximum. Therefore, only after the user intentionally bring the mobile terminal 8 close to the first sub-communication portion 21 of the image processing apparatus 10, connection for the first wireless communication 101 is enabled.

The first sub-communication portion 21 is built in a terminal placement table 90 formed in an upper portion of the front face of the image processing apparatus 10. The terminal placement table 90 is a part on which the mobile terminal 8 can be placed. In the present embodiment, when the mobile terminal 8 is brought close enough to almost contact with the terminal placement table 90, connection for the first wireless communication 101 is enabled.

Bluetooth uses radio waves of 2.4 GHz band frequencies. In Bluetooth, the communicable distance is about 1 meter to 10 meters and the communication speed is 24 Mbps at maximum. Therefore, in the second wireless communication 102, a comparatively large-sized data such as image data can be transmitted in a short time.

[First Sub-Communication Portion 84 and Second Sub-Communication Portion 85 of Mobile Terminal 8]

The first sub-communication portion 84 is a communication interface that performs the first wireless communication 101. The second sub-communication portion 85 is a communication interface that performs the second wireless communication 102. It should be noted that the first sub-communication portion 84 and the second sub-communication portion 85 are examples of a terminal-side first communication portion and a terminal-side second communication portion, respectively.

[Settable Condition Information D1]

The settable condition information D1 is previously stored in the storage portion 12. The settable condition information D1 is information of a settable condition indicating a condition for a job settable in the image processing apparatus 10.

For example, there are cases where the settable condition information D1 includes information such as resolutions, reading densities, and various types of modes that can be set for a scanning job and a copying job to be performed in the image processing apparatus 10. Here, there are cases where the settable modes include a color reading mode, a continuous reading mode, and the like.

Moreover, there are cases where the settable condition information D1 includes information such as a color printing mode, a both-side printing mode, and an aggregate printing mode that can be set for the copying job.

[Job Setting/Executing Process]

The image processing apparatus 10 and the mobile terminal 8 of the image processing system 2 executes a job setting/executing process. The job setting/executing process is a process for setting a condition for a job regarding image processing in accordance with operation performed by the user, and for executing the job in accordance with the set condition. The job is a scanning job, a copying job, or the like, for example.

Hereinafter, with reference to the flow chart shown in FIG. 4, one example of the procedure of the job setting/executing process performed in the image processing system 2 will be described. In the following description, S101, S102, . . . each represents an identification character of its corresponding step executed by the image processing apparatus 10 in the job setting/executing process. S201, S202, . . . each represents an identification character of its corresponding step executed by the mobile terminal 8 in the job setting/executing process.

<Step S101>

In the image processing apparatus 10, the first sub-communication portion 21 executes a link establishing process. The link establishing process is a process for establishing a link for the second wireless communication 102 between the image processing apparatus 10 and the mobile terminal 8.

In the link establishing process, the first sub-communication portion 21 of the image processing apparatus 10 executes a handover process between the first sub-communication portion 21 and the transmission source of a signal for the first wireless communication 101. The transmission source of the signal in step S101 is the mobile terminal 8. The handover process is a process of establishing communication connection through the first wireless communication 101, and then handing over the communication connection to the second wireless communication 102. The link establishing process will be described later (see FIG. 5).

<Step S102>

If the link establishing process has succeeded, the main control portion 1 transmits settable condition information D1 through the second sub-communication portion 22 to the mobile terminal 8. The success of the link establishing process means success of the handover process.

<Step S103>

The main control portion 1 executes a process for confirming reception of a request from the mobile terminal 8 through the second sub-communication portion 22. Then, the main control portion 1 executes a process that corresponds to the content of the request from the mobile terminal 8.

<Step S104>

If the main control portion 1 has received a job execution request from the mobile terminal 8 through the second sub-communication portion 22, the main control portion 1 causes the job processing portion 3 to execute the job in accordance with the job execution request.

As described later, the job execution request includes a designated content of the settable condition transmitted in step S102. The main control portion 1 causes the job processing portion 3 to execute the job in accordance with the designated content of the settable condition in the job execution request (S104).

It should be noted that the main control portion 1 executing the process of step S104 is one example of a job control portion. If the job ends, the main control portion 1 repeats the processes from step S103.

<Step S105>

If the main control portion 1 has received an ending request from the mobile terminal 8 through the second sub-communication portion 22, the main control portion 1 stops the second sub-communication portion 22. More specifically, by controlling the energization switch 7, the main control portion 1 stops power supply to the second sub-communication portion 22. Then, the image processing apparatus 10 enters a state of executing the processes from step S101.

In the image processing apparatus 10, by the MPU 11 executing a job control program Pr12 stored in the storage portion 12, the main control portion 1 executes the processes of step S102 to S104. It should be noted that the main control portion 1 executing the processes of steps S103 and S104 is one example of the job control portion. In steps S103 and S104, the main control portion 1 causes the job processing portion 3 to execute the job in accordance with the job execution request received from the mobile terminal 8 through the second sub-communication portion 22.

By the MPU 11 executing an activation control program Pr11 stored in the storage portion 12, the main control portion 1 executes the process of step S105.

<Step S201>

Meanwhile, the first sub-communication portion 84 of the mobile terminal 8 also executes the link establishing process. The transmission source of the signal for the first wireless communication 101 in step S201 is the image processing apparatus 10. The link establishing process will be described later (see FIG. 5).

<Step S202>

If the link establishing process between the first sub-communication portion 84 and the image processing apparatus 10 has succeeded, the CPU 81 causes a job setting program Pr22 to be automatically activated and executes the job setting program Pr22. The job setting program Pr22 is an application program for causing the CPU 81 to execute processes of steps S203 to S208 below.

By executing an activation control program Pr21 stored in the storage portion 82, the CPU 81 executes the process of step S202.

<Step S203>

Through the execution of the job setting program Pr22, first, the CPU 81 receives the settable condition information D1 from the image processing apparatus 10 through the second sub-communication portion 85.

<Step S204>

The CPU 81 causes the touch panel unit 87 to display a setting menu screen g2 regarding the image processing apparatus 10. The setting menu screen g2 is a screen on which to present the settable condition information D1.

Figure 7:
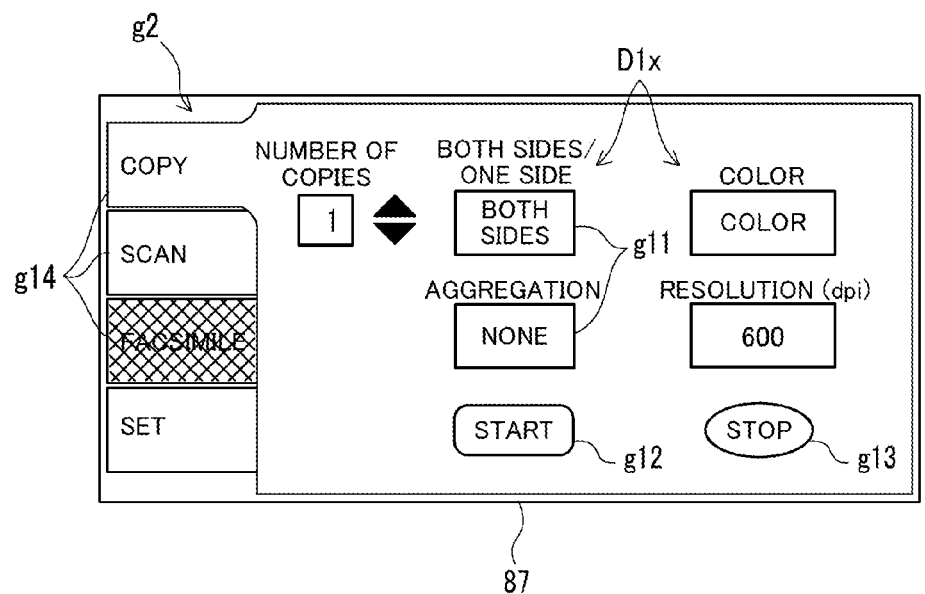
FIG. 7 shows one example of a setting menu screen in the mobile information terminal in the image processing system according to the first embodiment.

FIG. 7 is one example of the setting menu screen g2. In the example shown in FIG. 7, the setting menu screen g2 includes the settable condition information D1, a designated content input frame g11, a start selection portion g12, a stop selection portion g13, a job type selection portion g14, and the like.

In step S204, the CPU 81 generates data of the setting menu screen g2 from basic menu screen data Dg1 previously registered in the storage portion 12. The basic menu screen data Dg1 is data representing a basic menu screen g1.

It should be noted that the part, in the storage portion 12, in which the basic menu screen data Dg1 is stored is one example of a basic menu screen storage portion.

Figure 6:
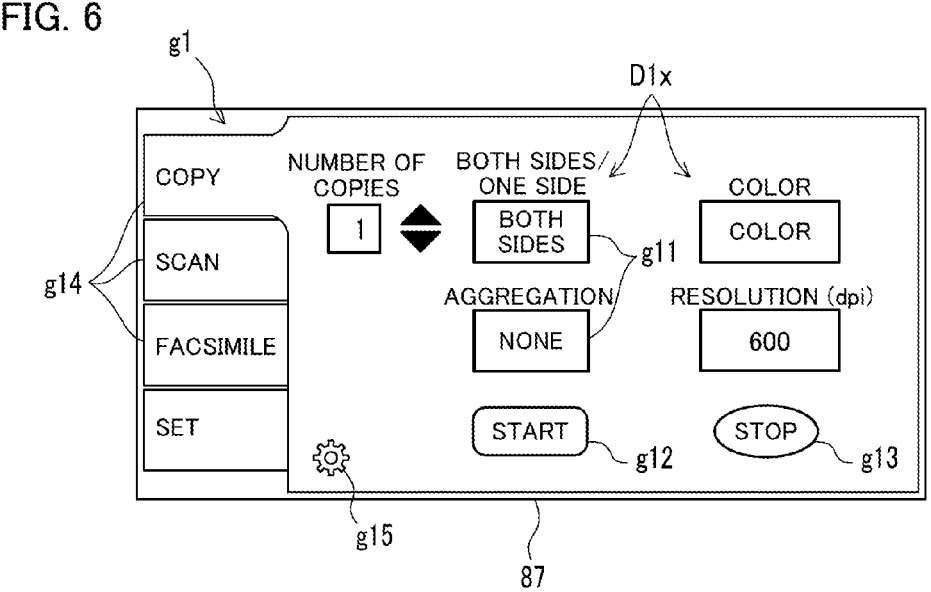
FIG. 6 shows one example of a basic menu screen in the mobile information terminal in the image processing system according to the first embodiment.

FIG. 6 shows one example of the basic menu screen g1. As shown in FIG. 6, the basic menu screen g1 is a screen on which to present candidate information D1$x$ indicating candidates for a plurality of the settable conditions regarding image processing. Further, the basic menu screen g1 includes the designated content input frame g11, the start selection portion g12, the stop selection portion g13, the job type selection portion g14, and the like.

The basic menu screen g1 includes, as information of settable conditions, a plurality of pieces of the candidate information D1$x$ conceivable as setting conditions for a job regarding image processing in various models of image processing apparatuses.

With respect to the basic menu screen data Dg1, the CPU 81 invalidates presentation of candidate information D1$x$ that does not match the condition indicated by the settable condition information D1 received from the image processing apparatus 10, thereby to generate data of the setting menu screen g2.

In the examples shown in FIGS. 6 and 7, the candidate information D1$x$ that does not match the condition indicated by the settable condition information D1 received from the image processing apparatus 10 is information regarding the setting condition for a facsimile job. In this case, the CPU 81 generates data of the setting menu screen g2 by invalidating the candidate information D1$x$ regarding the condition of the facsimile job in the basic menu screen data Dg1.

With reference to the example shown in FIG. 7, on the setting menu screen g2, the setting condition that corresponds to the invalidated candidate information D1$x$ is shown with half-tone dot meshing. On the setting menu screen g2, the content of the setting condition with half-tone dot meshing cannot be set.

It is also conceivable that a setting condition that corresponds to invalidated candidate information D1$x$ is excluded from the items to be displayed on the setting menu screen g2. It should be noted that the CPU 81 can execute a basic menu editing process for editing the basic menu screen data Dg1 in accordance with operation performed on the touch panel unit 87. The basic menu editing process will be described later.

<Step S205>

While the setting menu screen g2 is displayed, the CPU 81 of the mobile terminal 8 sets the designated content of the settable condition for the job in accordance with operation performed on the touch panel unit 87. The designated content input frame g11 on the setting menu screen g2 is an input frame for the designated content of the settable condition.

If the CPU 81 has detected operation, performed on the touch panel unit 87, of selecting another setting menu screen g2, the CPU 81 repeats the processes from step S204 with regard to the selected setting menu screen g2. That is, the CPU 81 causes the touch panel unit 87 to display the selected setting menu screen g2 (step S204).

In the present embodiment, if the job type selection portion g14 on the setting menu screen g2 has been operated, the CPU 81 causes the touch panel unit 87 to display the setting menu screen g2 regarding the selected type of the job.

<Step S206>

If operation for starting the job has been performed on the touch panel unit 87 while the setting menu screen g2 has been displayed, the CPU 81 of the mobile terminal 8 transmits the job execution request to the image processing apparatus 10.

The job execution request includes the designated content of the settable condition set in step S205. The job execution request is transmitted to the image processing apparatus 10 through the second sub-communication portion 85. After the process of step S206, the CPU 81 repeats the processes from step S204.

<Step S207>

If operation for ending the condition setting for the job has been performed on the touch panel unit 87 while the setting menu screen g2 has been displayed, the CPU 81 of the mobile terminal 8 executes an ending process (steps S207 to S209). The CPU 81 repeats the processes of steps S204 to S206 until the operation for ending the condition setting for the job is performed.

In the ending process, the CPU 81 transmits the ending request to the image processing apparatus 10 through the second sub-communication portion 85 (S207).

<Step S208>

Further, in the ending process, the CPU 81 ends the job setting program Pr22.

<Step S209>

Further, in ending process, the CPU 81 stops the second sub-communication portion 85. More specifically, by controlling the energization switch 88, the CPU 81 stops power supply to the second sub-communication portion 85. Then, the mobile terminal 8 enters a state of executing the processes from step S201.

By executing the activation control program Pr21 stored in the storage portion 82, the CPU 81 executes the process of step S209.

As described above, the processes of steps S203 to S204 are processes for causing the display portion to display the setting menu screen g2 on which to present the settable condition received from the image processing apparatus 10 through the second sub-communication portion 85. The process of step S205 is a process for setting the designated content of the settable condition in accordance with operation performed on the operation portion. The CPU 81 executing the processes of steps S203 to S205 is one example of a condition setting portion. By the job setting program Pr22 being activated, the function of the CPU 81 as the condition setting portion is activated.

The process of step S206 is a process for transmitting the job execution request including the designated content of the settable condition set in step S205, to the image processing apparatus 10 through the second sub-communication portion 85. The CPU 81 executing the process of step S206 is one example of a job execution requesting portion.

[The Link Establishing Process]

Next, with reference to the flow chart shown in FIG. 5, one example of the procedure of the link establishing process performed in the image processing system 2 will be described. In the following description, S301, S302, . . . each represents an identification character of its corresponding step executed by the image processing apparatus 10 in the link establishing process. S401, S402, . . . each represents an identification character of its corresponding step executed by the mobile terminal 8 in the link establishing process.

<Step S301>

In the image processing apparatus 10, first, the first sub-communication portion 21 confirms, at appropriate timings, the presence/absence of reception of a signal used in the first wireless communication 101. For example, it is conceivable that the first sub-communication portion 21 includes an NFC tag, and is activated by induced electromotive force which is caused by the signal used in the first wireless communication 101. It is also conceivable that the first sub-communication portion 21 that is constantly operating confirms the presence/absence of reception of the signal used in the first wireless communication 101.

The first sub-communication portion 21 sends a response signal in response to reception of the signal used in the first wireless communication 101. It should be noted that the first sub-communication portion 21 can perform communication using a weak radio wave having a small propagation distance. Thus, power consumption of the first sub-communication portion 21 and the first sub-communication portion 84 is very small.

<Step S302>

If the first sub-communication portion 21 has received the signal used in the first wireless communication 101, the main control portion 1 activates the second sub-communication portion 22. More specifically, by controlling the energization switch 7, the main control portion 1 starts power supply to the second sub-communication portion 22.

For example, the first sub-communication portion 21 notifies the main control portion 1 that the first sub-communication portion 21 has received the signal used in the first wireless communication 101, and the main control portion 1 activates the second sub-communication portion 22 upon receiving the notification. It is also conceivable that the first sub-communication portion 21 controls the energization switch 7, thereby activating the second sub-communication portion 22.

In the image processing apparatus 10, by the MPU 11 executing the activation control program Pr11, the main control portion 1 executes the process of step S302. That is, when the MPU 11 executes the activation control program Pr11, the main control portion 1 causes the second sub-communication portion 22 to be automatically activated after the first sub-communication portion 21 has received the signal used in the first wireless communication 101 (S302 in FIG. 5). Further, when the connection for the second wireless communication 102 is disconnected, the main control portion 1 causes the second sub-communication portion 22 to automatically stop (S105 in FIG. 4). The main control portion 1 executing the processes of step S302 and step S105 is one example of a body-side activation control portion.

<Step S303>

Further, the first sub-communication portion 21 of the image processing apparatus 10 executes the handover process between the first sub-communication portion 21 and the first sub-communication portion 84 of the mobile terminal 8. As mentioned above, the handover process is a process of establishing communication connection through the first wireless communication 101, and then handing over the communication connection to the second wireless communication 102. If the first sub-communication portion 21 receives the signal used in the first wireless communication 101, the first sub-communication portion 21 automatically executes the handover process.

In the case where the first wireless communication 101 is NFC and the second wireless communication 102 is Bluetooth (registered trademark) communication, the handover process is known as Bluetooth handover. In the Bluetooth handover, the first sub-communication portion 21 of the image processing apparatus 10 and the first sub-communication portion 84 of the mobile terminal 8 perform a pairing process and an authentication process.

A public-key cryptography used in the pairing process and authentication codes used in the authentication process are previously stored in the non-volatile storage portion provided in each of the first sub-communication portion 21 of the image processing apparatus 10 and the first sub-communication portion 84 of the mobile terminal 8. If the pairing process and the authentication process have been completed, it means that the handover process has succeeded.

Figure 4:
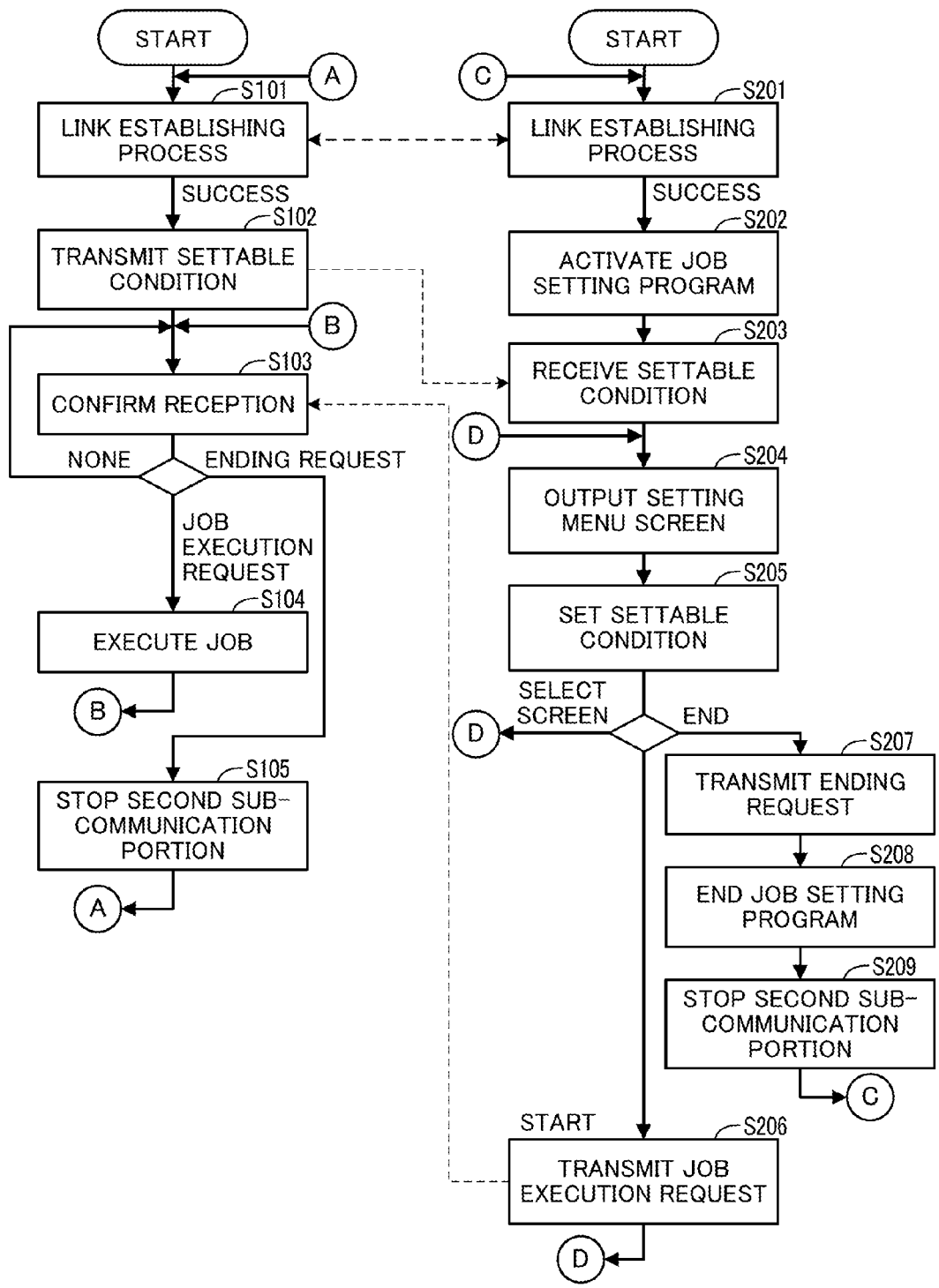
FIG. 4 is a flow chart indicating one example of the procedure of a job setting/executing process performed in the image processing system according to the first embodiment.

If the handover process has succeeded, the main control portion 1 executes the processes from step S102 in FIG. 4. If the handover process has failed, the first sub-communication portion 21 returns to the state of step S301.

It is also conceivable that a signal used in the first wireless communication 101 is received from a mobile terminal 8 other than the mobile terminal 8 being the connection destination while the connection for the second wireless communication 102 is continued. In this case, in step S303, the first sub-communication portion 21 does not execute the handover process between the first sub-communication portion 21 and the mobile terminal 8 other than the mobile terminal 8 being the connection destination which is already in connection with the first sub-communication portion 21.

<Step S401>

On the other hand, in the mobile terminal 8, first, the first sub-communication portion 84 confirms, at appropriate timings, the presence/absence of reception of a signal used in the first wireless communication 101. For example, it is conceivable that the first sub-communication portion 84 that is constantly operating confirms the presence/absence of reception of the signal used in the first wireless communication 101.

For example, it is conceivable that the signal used in the first wireless communication 101 and received by the first sub-communication portion 84 is a response signal that has been sent in response to the signal that the first sub-communication portion 84 has outputted.

<Step S402>

If the first sub-communication portion 84 has received the signal used in the first wireless communication 101, the CPU 81 activates the second sub-communication portion 85. More specifically, by controlling the energization switch 88, the CPU 81 starts power supply to the second sub-communication portion 85.

For example, the first sub-communication portion 84 notifies the CPU 81 that the first sub-communication portion 84 has received the signal used in the first wireless communication 101, and the CPU 81 activates the second sub-communication portion 85 upon receiving the notification. It is also conceivable that the first sub-communication portion 84 controls the energization switch 88, thereby activating the second sub-communication portion 85.

In the mobile terminal 8, by executing the activation control program Pr21, the CPU 81 executes the process of step S402. That is, when executing the activation control program Pr21, the CPU 81 executes the following processes. First, the CPU 81 causes the job setting program Pr22 to be automatically activated in response to the success of the handover process. The CPU 81 executing the process of step S402 is one example of a terminal-side activation control portion.

Figure 5:
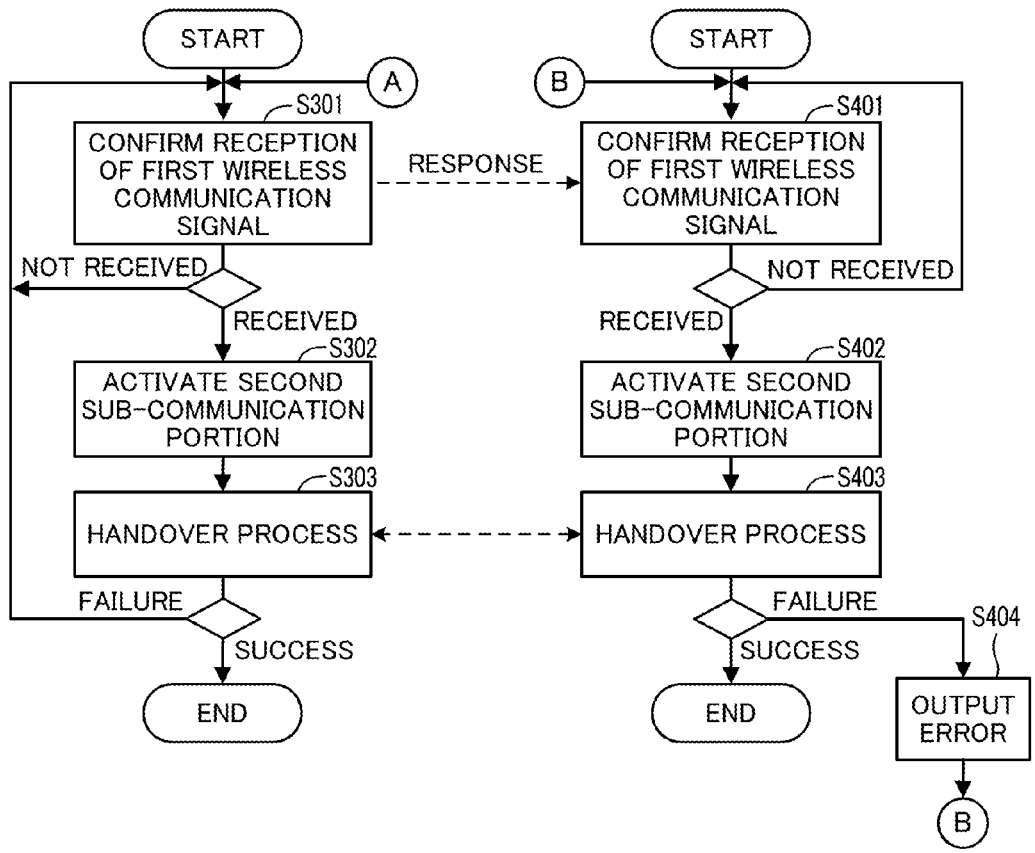
FIG. 5 is a flow chart indicating one example of the procedure of a link establishing process performed in the image processing system according to the first embodiment.

Further, the CPU 81 causes the second sub-communication portion 85 to be automatically activated after the first sub-communication portion 84 has received the signal used in the first wireless communication 101 (S402 in FIG. 5). Further, when the connection for the second wireless communication 102 is disconnected, the CPU 81 causes the second sub-communication portion 22 to automatically stop (S209 in FIG. 4).

<Step S403>

If the first sub-communication portion 84 of the mobile terminal 8 has received the signal used in the first wireless communication 101, the first sub-communication portion 84 executes the handover process between the first sub-communication portion 84 and the first sub-communication portion 21 of the image processing apparatus 10.

If the handover process has succeeded, the CPU 81 executes the processes from step S202 in FIG. 4.

<Step S404>

If the handover process has failed, the first sub-communication portion 84 outputs an error message to the touch panel unit 87, and then, returns to the state of step S401.

[The Basic Menu Editing Process]

Next, the basic menu editing process will be described with reference to FIGS. 6 and 8. The CPU 81 of the mobile terminal 8 executes the basic menu editing process by executing a basic menu editing program Pr23 stored in the storage portion 82.

If the CPU 81 detects that predetermined edit selection operation has been performed while the basic menu screen g1 has been displayed, the CPU 81 activates the basic menu editing program Pr23 and executes the basic menu editing process.

In the example shown in FIG. 6, the basic menu screen g1 includes an edit mode selection portion g15, and operation performed on the edit mode selection portion g15 is the edit selection operation.

In the basic menu editing process, the CPU 81 edits the presentation layout of candidates for the settable conditions in the data of the basic menu screen g1, in accordance with operation performed on the touch panel unit 87. It should be noted that the CPU 81 executing the basic menu editing process is one example of a basic menu edit portion.

Figure 8:
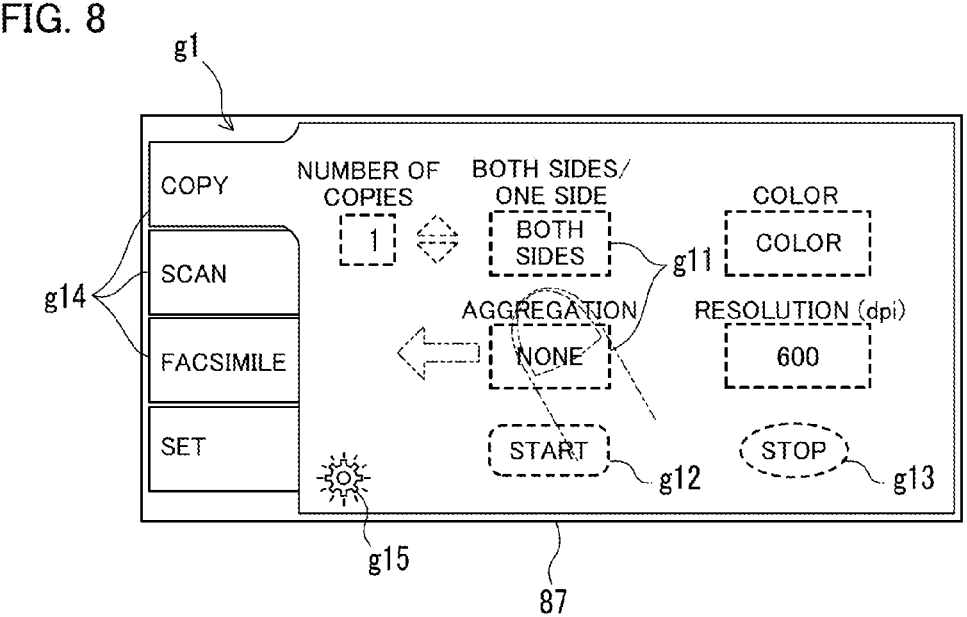
FIG. 8 shows one example of a setting menu editing screen in the mobile information terminal in the image processing system according to the first embodiment.

For example, as shown in FIG. 8, in accordance with dragging operation performed on the display region of the settable condition information D1 or the designated content input frame g11 on the basic menu screen g1, the CPU 81 changes the display positions of the settable condition information D1 and the designated content input frame g11.

Then, when the edit selection operation is performed again, the CPU 81 updates the basic menu screen data Dg1 in the storage portion 82 to the data representing the edited basic menu screen g1. Thereafter, the CPU 81 organizes the setting menu screen g2 based on the updated basic menu screen data Dg1.

In the present embodiment, the image processing apparatus 10 can be operated through the mobile terminal 8. Therefore, the image processing apparatus 10 does not include a touch panel unit. This greatly contributes to power saving and cost reduction for the image processing apparatus 10.

The handover process using the first wireless communication 101 whose communicable distance is about 10 cm is executed as a process for establishing connection for the second wireless communication 102. Therefore, the operation until the connection for the second wireless communication 102 is established is very simple operation of merely bringing the mobile terminal 8 above the terminal placement table 90 of the image processing apparatus 10.

In the image processing apparatus 10 and the mobile terminal 8, the second wireless communication 102 which is comparatively fast is used in transmitting/receiving data for execution of the job. Accordingly, it is possible to avoid that the execution of the job regarding image processing takes time.

The first sub-communication portion 21 does not execute the handover process between the first sub-communication portion 21 and a mobile terminal 8 other than the mobile terminal 8 being the connection destination, while the connection for the second wireless communication 102 is continued. Therefore, the image processing apparatus 10 need not execute a plurality of job receiving processes. Thus, it is possible to avoid that the job receiving processes take time due to restriction on the speed of the second wireless communication 102.

The main control portion 1 causes the second sub-communication portion 22 to operate only when necessary, through the automatic activation (S302 in FIG. 5) and the automatic stop (S105 in FIG. 4) of the second sub-communication portion 22. Accordingly, power consumption of the image processing apparatus 10 in the standby state is reduced. It should be noted that the power consumption of the first sub-communication portion 21 is very small.

In the mobile terminal 8, the CPU 81 causes the job setting program Pr22 that corresponds to the condition setting portion, to be automatically activated in response to success of the handover process. Accordingly, with respect to the mobile terminal 8, the work can be omitted of previously selecting and activating an application program that corresponds to the image processing apparatus 10 to be operated.

In the mobile terminal 8, the CPU 81 generates data of the setting menu screen g2 based on the basic menu screen data Dg1. At that time, the CPU 81 invalidates presentation of candidates for conditions that do not match the settable condition, in the basic menu screen data Dg1, which has been received from the image processing apparatus 10.

Therefore, it is not necessary that application programs that are different for the respective models of the image processing apparatus 10 are previously installed in the mobile terminal 8. Further, it is not necessary for the user to perform operation of activating an application program that is different for each model of the image processing apparatus 10. Furthermore, it is also not necessary for the user to remember operation that is different for each model of the image processing apparatus 10.

The mobile terminal 8 can execute the basic menu editing process. Accordingly, the user can customize the setting menu screen g2 into a screen that suits his/her preference, which is very convenient.

Second Embodiment: Job Setting/Executing Process

Next, with reference to the flow chart shown in FIG. 9, one example of the procedure of the job setting/executing process in the image processing system according to a second embodiment will be described. In the following description, S501, S502, . . . each represents an identification character of its corresponding step executed by the image processing apparatus 10 in the job setting/executing process. S601, S602, . . . each represents an identification character of its corresponding step executed by the mobile terminal 8 in the job setting/executing process.

In the first embodiment, the CPU 81 of the mobile terminal 8 organizes the setting menu screen g2. On the other hand, in the second embodiment, the main control portion 1 of the image processing apparatus 10 transmits data of the setting menu screen g2 to the mobile terminal 8. This is the point in which the second embodiment is different from the first embodiment.

<Step S501>

In the image processing apparatus 10, first, the first sub-communication portion 21 executes the link establishing process (see FIG. 5).

<Step S502>

If the link establishing process has succeeded, the main control portion 1 executes the process for confirming reception of a request from the mobile terminal 8 through the second sub-communication portion 22. Then, the main control portion 1 executes a process that corresponds to the content of the request from the mobile terminal 8.

<Step S503>

If the main control portion 1 has received a screen request from the mobile terminal 8 through the second sub-communication portion 22, the main control portion 1 transmits data of the setting menu screen g2 to the mobile terminal 8 through the second sub-communication portion 22. As mentioned above, the setting menu screen g2 is a screen on which to present the settable condition information D1 (see FIG. 7).

That is, if the handover process has succeeded, the main control portion 1 transmits, to the mobile terminal 8, the data of the setting menu screen g2 on which to present the settable condition. It should be noted that the main control portion 1 executing the process of step S503 is one example of a settable condition transmitting portion.

For example, it is conceivable that the data of the setting menu screen g2 is screen data expressed in predetermined markup language, such as HTML. In this case, it is sufficient that a web browser program Pr24 is installed in the mobile terminal 8. That is, it is not necessary that a special application program corresponding to the image processing apparatus 10 is installed in the mobile terminal 8.

In the case where a plurality of the setting menu screens g2 are present, the main control portion 1 transmits, to the mobile terminal 8, the data of the setting menu screen g2 requested by the mobile terminal 8. For example, with respect to the first screen request received after the link establishing process, the main control portion 1 transmits, to the mobile terminal 8, data of the setting menu screen g2 which will be a main menu.

It is conceivable that the data of the setting menu screen g2 is data of a menu screen that includes, as an option, a shift instruction to another setting menu screen g2. For example, it is conceivable that an HTML tag for receiving such a shift instruction to another setting menu screen g2 is included in the data of the setting menu screen g2.

Then, if the main control portion 1 has received the shift instruction (step S502), the main control portion 1 transmits, to the mobile terminal 8, one piece of data corresponding to the shift instruction from among the plurality of pieces of data of the plurality of the setting menu screens g2 (step S503).

<Step S504>

If the main control portion 1 has received the job execution request from the mobile terminal 8 through the second sub-communication portion 22, the main control portion 1 causes the job processing portion 3 to execute the job in accordance with the job execution request. This is the same as in step S104 in FIG. 4.

The job execution request includes the designated content of the settable condition corresponding to the data of the setting menu screen g2 transmitted in step S503. For example, the content set in the designated content input frame g11 on the setting menu screen g2 shown in FIG. 7 is the designated content of the settable condition.

It should be noted that the main control portion 1 executing the process of step S504 is one example of the job control portion. When the job ends, the main control portion 1 repeats the processes from step S502.

<Step S505>

If the main control portion 1 has received an ending request from the mobile terminal 8 through the second sub-communication portion 22, the main control portion 1 stops the second sub-communication portion 22. This is the same as in step S105 in FIG. 4. Then, the image processing apparatus 10 enters a state of executing the processes from step S501.

By the MPU 11 executing the job control program Pr12, the main control portion 1 executes the processes of steps S502 to S504. It should be noted that the main control portion 1 executing the processes of steps S503 and S504 is one example of the job control portion.

By the MPU 11 executing the activation control program Pr11, the main control portion 1 executes the process of step S505.

<Step S601>

On the other hand, the first sub-communication portion 84 of the mobile terminal 8 also executes the link establishing process (see FIG. 5).

<Step S602>

If the link establishing process has succeeded between the first sub-communication portion 84 and the image processing apparatus 10, the CPU 81 automatically transmits the screen request to the image processing apparatus 10 through the second sub-communication portion 85. The screen request is a request for data of the setting menu screen g2.

<Step S603>

After the screen request has been transmitted, the CPU 81 receives, through the second sub-communication portion 85, the data of the setting menu screen g2 transmitted from the image processing apparatus 10. Further, the CPU 81 causes the touch panel unit 87 to display the setting menu screen g2 based on the received data (see FIG. 7).

For example, in step S603, the CPU 81 causes the web browser program Pr24 previously installed in the storage portion 82 to be automatically activated. Then, by executing the web browser program Pr24, the CPU 81 causes the touch panel unit 87 to display the setting menu screen g2 based on the received data expressed in markup language.

<Step S604>

While the setting menu screen g2 is displayed, the CPU 81 of the mobile terminal 8 sets the designated content of the settable condition for the job in accordance with operation performed on the touch panel unit 87. This is the same as in step S205 in FIG. 4.

<Step S605>

If operation for starting the job has been performed on the touch panel unit 87 while the setting menu screen g2 has been displayed, the CPU 81 of the mobile terminal 8 transmits the job execution request to the image processing apparatus 10. This is the same as in step S206 in FIG. 4. After the process of step S605, the CPU 81 repeats the processes from step S602.

The job execution request includes the designated content of the settable condition set in step S604. The job execution request is transmitted to the image processing apparatus 10 through the second sub-communication portion 85.

If the CPU 81 has detected operation, performed on the touch panel unit 87, of selecting another setting menu screen g2, the CPU 81 repeats the processes from step S602. In this case, in step S602, the CPU 81 transmits, to the image processing apparatus 10, a screen request that requests the another setting menu screen g2 having been selected.

<Steps S606 to S608>

If ending operation has been performed on the touch panel unit 87 while the setting menu screen g2 has been displayed, the CPU 81 of the mobile terminal 8 executes an ending process (steps S606 to S608). The CPU 81 repeats the processes of steps S602 to S605 until operation for ending the condition setting of the job is performed.

The ending process of steps S606 to S608 is the same as the ending process of the steps S207 to S209 in FIG. 4. After the ending process, the mobile terminal 8 enters a state of executing the processes from step S601.

The CPU 81 executes the process of step S608 by executing the activation control program Pr21.

It should be noted that the CPU 81 executing the processes of steps S602 to S604 is one example of the condition setting portion. The CPU 81 executing the process of step S605 is one example of the job execution requesting portion.

In the case where the present embodiment is employed, the same effect as in the case where the first embodiment is employed is obtained. In the present embodiment, the image processing apparatus 10 transmits the data of the setting menu screen g2 to the mobile terminal 8. Accordingly, it is not necessary to install in the mobile terminal 8 a special application program corresponding to the image processing apparatus 10.

Applied Example

Figure 9:
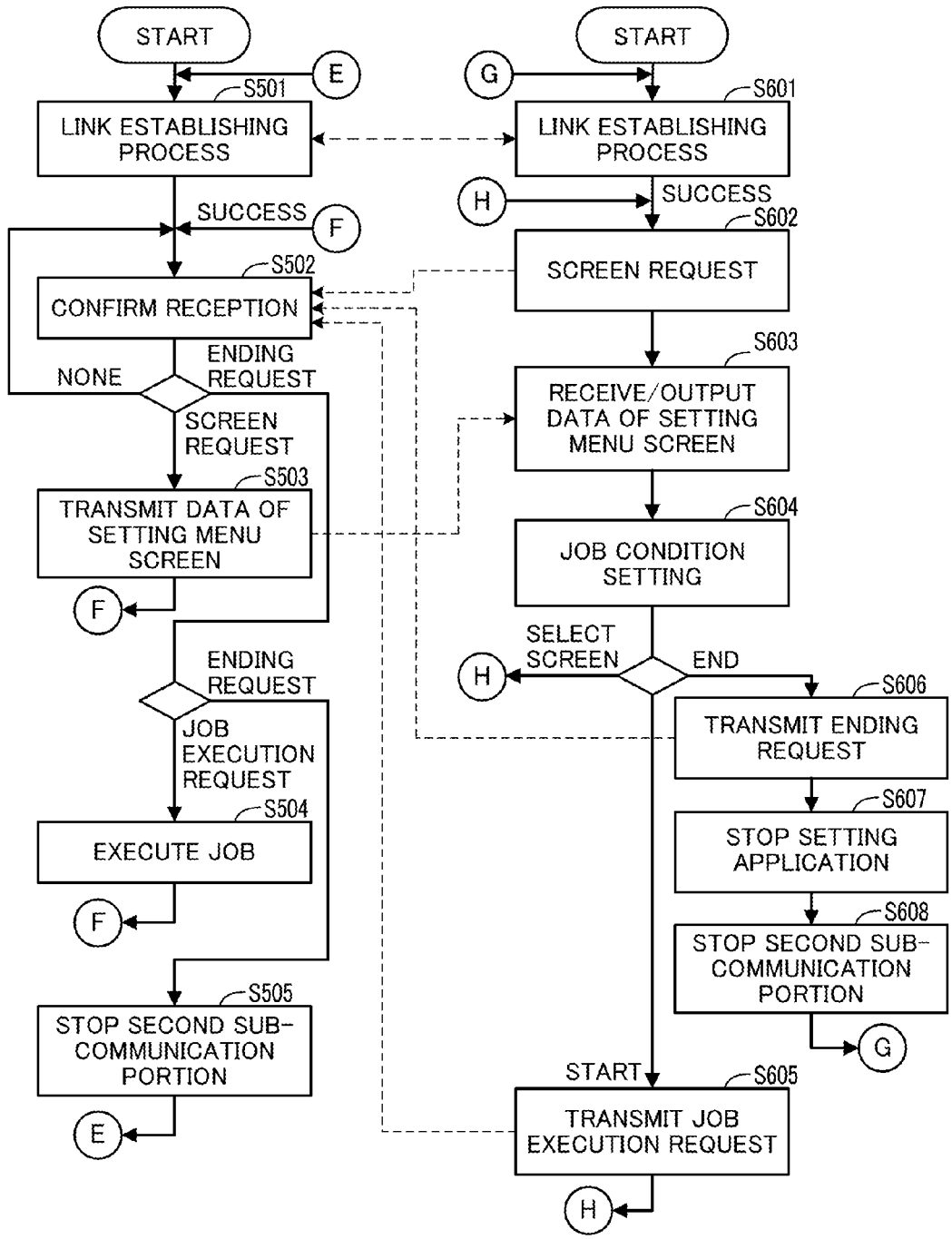
FIG. 9 is a flow chart showing one example of the procedure of a job setting/executing process in the image processing system according to a second embodiment.

It is conceivable that, in step S502 in FIG. 9, in the case where the main control portion 1 of the image processing apparatus 10 has received the shift instruction to one of some predetermined setting menu screens g2, the second sub-communication portion 22 disconnects the connection for the second wireless communication 102. The second sub-communication portion 22 stopped as a result of the execution of the process of step S505 disconnects the connection for the second wireless communication 102.

For example, it is conceivable that the setting menu screen g2 being the shift destination indicated by the shift instruction is a specific screen that is not directly relevant to the execution of the job, such as a screen for setting an initial value for a designation of the setting condition for the job. In such a case, it is conceivable that the second sub-communication portion 22 disconnects the connection for the second wireless communication 102 once. Thereafter, when a mobile terminal 8 is brought close to the terminal placement table 90 again, the image processing apparatus 10 and the mobile terminal 8 execute the link establishing process.

Further, the CPU 81 of the mobile terminal 8 transmits the request corresponding to operation performed on the specific screen, to the image processing apparatus 10 through the second sub-communication portion 85. The image processing apparatus 10 executes a process that corresponds to the request. Accordingly, another user who is intended to execute the job can operate the image processing apparatus 10 by using the mobile terminal 8.

The image processing apparatus, the mobile information terminal, and the image processing system according to the present disclosure can also be configured by freely combining the embodiments and the applied example described above, or by omitting a part of or modifying the embodiments and the applied example as appropriate, within the scope of the invention defined by claims.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus communicable with a mobile information terminal, the image processing apparatus comprising:
 a job processing device configured to execute a job regarding image processing;

a body-side first communication device configured to perform first wireless communication being proximity-type wireless communication;

a body-side second communication device configured to perform second wireless communication whose communicable distance is longer than that of the first wireless communication and whose communication speed is faster than that of the first wireless communication;

a settable condition transmitting portion configured to transmit information of a settable condition representing a condition for a job settable in the image processing apparatus, to the mobile information terminal through the body-side second communication device;

a body-side activation control portion configured to cause the body-side second communication portion to be automatically activated by starting power supply to the body-side second communication portion after the body-side first communication portion has received the signal used in the first wireless communication, and configured to cause the body-side second communication portion to automatically stop by stopping power supply to the body-side second communication portion when the connection for the second wireless communication is disconnected; and a job control portion configured to cause the job processing device to execute the job in accordance with a job execution request received from the mobile information terminal through the body-side second communication device, wherein if the body-side first communication device has received a signal used in the first wireless communication, the body-side first communication device executes a handover process of automatically establishing communication connection between the body-side first communication device and a transmission source of the signal through the first wireless communication, and then handing over the communication connection to the second wireless communication, if the handover process has succeeded, the settable condition transmitting portion transmits the information of the settable condition and data of a setting menu screen on which to present the settable condition to the mobile information terminal, wherein the data of the setting menu screen is expressed in a markup language and is data of a menu screen including, as an option, a shift instruction to another setting menu screen, wherein, if the shift instruction has been received from the mobile information terminal, the settable condition transmitting portion transmits, to the mobile information terminal, a piece of data corresponding to the shift instruction from among a plurality of pieces of data of a plurality of the setting menu screens, wherein the plurality of the setting menu screens includes a specific screen for setting information that is not directly relevant to the execution of the job, and wherein, if the shift instruction to the specific screen has been received, the body-side second communication portion disconnects the connection for the second wireless communication, and the job execution request includes a designated content of the settable condition.

2. The image processing apparatus according to claim 1, wherein the body-side first communication device does not execute the handover process between the body-side first communication device and a mobile information terminal other than the mobile information terminal is a connection destination while the connection for the second wireless communication is continued.

3. The image processing apparatus according to claim 1, wherein the first wireless communication is wireless communication conforming to ISO/IEC 18092 standard, and the second wireless communication is wireless communication conforming to IEEE 802.15.1 standard.

4. The image processing apparatus of claim 1, wherein the specific screen includes a screen for setting an initial value for a designation of the settable condition.

* * * * *